United States Patent [19]

Akagi et al.

[11] Patent Number: 4,483,369
[45] Date of Patent: Nov. 20, 1984

[54] LINEAR MOTOR-ACTUATED FLOW CONTROL VALVE

[75] Inventors: Motonobu Akagi, Kariya; Yasuhiro Kawabata, Anjo; Kyo Hattori, Susono, all of Japan

[73] Assignees: Aisin Seiki Kabushiki Kaisha, Kariya; Toyota Jidoshakogyo Kabushiki Kaisha, Toyota, both of Japan

[21] Appl. No.: 374,347

[22] Filed: May 3, 1982

[30] Foreign Application Priority Data

May 2, 1981 [JP] Japan .................................. 56-67347

[51] Int. Cl.³ ....................... F16K 31/08; F16K 11/07
[52] U.S. Cl. ........................... 137/625.12; 137/625.33; 137/625.3; 251/129
[58] Field of Search ....................... 137/625.61, 625.62, 137/625.3, 129, 65, 625.33, 625.12

[56] References Cited

U.S. PATENT DOCUMENTS

| | | |
|---|---|---|
| 4,056,178 | 11/1977 | Detty . |
| 4,216,938 | 8/1980 | Inada et al. . |
| 4,286,767 | 9/1981 | Hashimoto ........................... 251/65 |
| 4,378,766 | 4/1983 | Yamazoe et al. ............... 251/129 X |

Primary Examiner—Arnold Rosenthal
Attorney, Agent, or Firm—Burns, Doane, Swecker and Mathis

[57] ABSTRACT

A linear motor-actuated flow control valve includes spring means for biasing a bobbin controlling valve hole opening degree in mutually opposing directions, to hold the bobbin at a middle opened position when an electromagnetic coil wound on the bobbin is deenergized. The bobbin is driven against spring means force in any opposing directions to increase or decrease the opening degree by applying a positive or negative energizing current to the coil.

12 Claims, 5 Drawing Figures

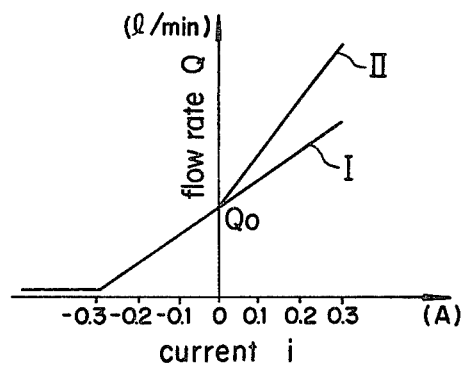
FIG. 2
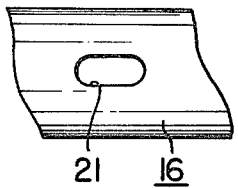 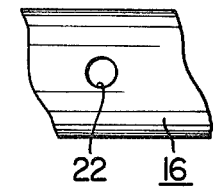
FIG.3a    FIG.3b
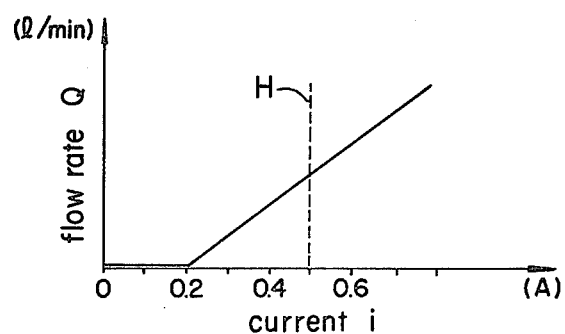
FIG.4 (PRIOR ART)

LINEAR MOTOR-ACTUATED FLOW CONTROL VALVE

BACKGROUND

This invention relates to a linear motor-actuated flow control valve assembly having an electromagnetically actuated and controlled moving-coil linear motor, and valve means for controlling the degree of communication between an inlet port and outlet port in accordance with the operation of the linear motor. More particularly, the invention relates to a valve assembly of the type described in which the flow rate between the two ports can be controlled in proportion to the electric current applied.

In general, a linear motor-actuated flow control valve of the aforementioned type includes a moving-coil linear motor which is arranged within a casing having an inlet port and outlet port. The moving-coil linear motor comprises a hollow, ferromagnetic core which delimits valve chambers and which is provided with a valve hole for communicating the two ports, a bobbin, having an electromagnetic coil wound thereon, slidably disposed on the core for controlling the opening degree of the valve hole, permanent magnets so arranged as to produce a magnetic flux axially of the electromagnetic coil, and a ferromagnetic body for forming, together with the core, a magnetic circuit for the permanent magnets. The arrangement is such that passing an energizing current through the electromagnetic coil causes the bobbin to regulate the opening of the valve hole by moving the bobbin against a biasing force applied to the bobbin by spring means.

In the conventional linear motor-actuated flow control valve of the above kind, the bobbin is biased in a given direction (ordinarily the fully-closed direction) by the spring means. By passing an energizing current through the electromagnetic coil, a repulsive force is produced to drive the bobbin against the biasing force applied by the spring means, whereby the valve hole may be regulated to a predetermined opening degree between the fully-closed and fully-open positions as a function of the magnitude of the energizing current. One example of the relationship between the current i and the flow rate Q in such case is illustrated in FIG. 4, which shows the flow rate characteristic of a proportional relation. This type of linear motor-actuated flow control valve is frequently employed to control the air-fuel ratio in the internal combustion engine of an automotive vehicle. In such case the flow control valve operates with the valve hole open approximately mid-way while the vehicle is travelling, with control being effected either toward the fully-open or fully-closed positions from the mid-way position. Accordingly, it has been necessary to hold the excitation current at a fixed magnitude constantly under predetermined control conditions while the vehicle is running, also to apply allowable maximum current in order to open the valve hole fully when so desired. Moreover, in order to achieve stable control characteristics despite the vibration which acts upon the system, conventional practice has been to employ spring means having a considerably large spring modulus for the purpose of biasing the bobbin, and this has in turn required that the electromagnetic coil be energized to a greater degree to be able to drive the bobbin against the force of the spring means. This makes it difficult to achieve a low level of power consumption because regulating the valve when the vehicle is running requires the expenditure of considerable excitation current.

The following is counted as additional disadvantage in the prior art:

The above-described control valve which is normally biased closed during non-excitation of the electromagnetic coil is employed as an air-fuel ratio control valve in the carburetor by-pass of a vehicle engine during engine idling. However, this can lead to a problem wherein engine starting cannot be achieved when ice forms adjacent the throttle valve of the carburetor in a cold environment since ice forms at the control valve closed.

Therefore, there has been much to be desired in the prior art.

SUMMARY OF THE INVENTION

It is therefore an object of the present invention to provide a novel and improved linear motor-actuated flow control valve.

It is another object of the present invention to provide a linear motor-actuated flow control valve actuatable with reduced power consumption.

Other objects of the present invention will be apparent in the entire disclosure in the application.

To this end, a flow control valve actuated by a linear motor in accordance with the present invention is provided with spring means for biasing the bobbin in mutually opposing directions in such fashion that the valve holes are held open to a predetermined degree when the electromagnetic coil is in the de-energized state, wherein, when an energizing current is passed through the electromagnetic coil, the opening degree of the valve holes is regulated from the predetermined opening degree toward either the fully-open or fully-closed state depending upon whether the energizing current is positive or negative.

BRIEF DESCRIPTION OF THE DRAWINGS

FIG. 2 is a graph of a control characteristic according to the present invention, in which flow rate Q(l/min) is plotted against current (A);

FIGS. 3a and 3b show examples of valve holes according to the present invention; and FIG. 4 is a graph showing a flow rate-current characteristic curve according to the prior art.

Figure 1:
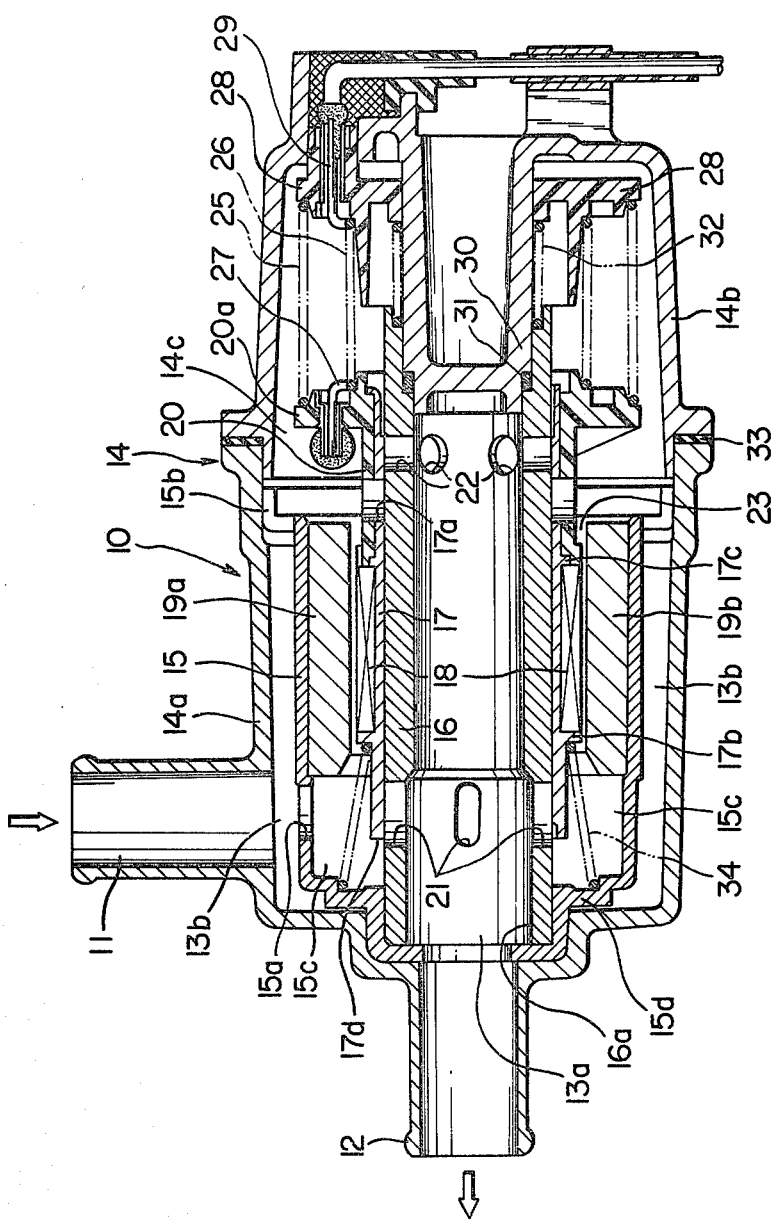
FIG. 1 is a longitudinal section view illustrating an embodiment of a linear motor-actuated flow control valve assembly according to the present invention.

In the following, preferred embodiments of the present invention will be described with reference to the accompanying drawing which serves to better illustration of the embodiments of the invention and not to limitation thereof.

DESCRIPTION OF THE PREFERRED EMBODIMENTS

An embodiment of the present invention will now be described in conjunction with the accompanying drawings.

In the embodiment illustrated in FIG. 1, a linear motor-actuated flow control valve assembly is shown generally at numeral 10. The valve assembly 10 includes a cylindrical casing 14 which comprises a casing section 14a of a non-magnetic material (such as an aluminum alloy) having an inlet port 11 and an outlet port 12, and defining a valve chamber 13b on the inlet port side, and a casing section 14b, also made of a non-magnetic material such as an aluminum alloy, hermetically fit in the casing section 14a through a sealing member 33. A hollow, ferromagnetic core 16 is disposed coaxially within the casing 14 in such fashion as to form a valve chamber 13a which communicates with the outlet port 12. Thus the hollow, ferromagnetic core 16 forms a partition between the two valve chambers 13a and 13b. Communication is established between these two valve chambers 13a and 13b by means of valve holes 21 and 22 formed in the wall of the core 16. The valve holes 21 are located at a portion of the ferromagnetic core 16 that lies within a magnetic circuit formed by permanent magnets 19a and 19b, as will be described below. The valve holes 22 are disposed at the other end of the core 16, namely at that portion thereof that does not lie within the magnetic circuit.

The valve assembly further includes a bobbin 17 consisting of a non-magnetic material, such as a synthetic resin or a metal sleeve encased with a synthetic resin. The bobbin 17 is slidably disposed on the core 16 so as to be capable of sliding axially thereof, and has an electromagnetic coil 18 wound on the central portion thereof. A pair of permanent magnets 19a and 19b are affixed to the inner side of an inner casing 15 comprising a magnetic material. The permanent magnets 19a and 19b are spaced away from the coil 18 to form an intervening clearance 23, and are so arranged that the magnetic flux produced thereby passes through the coil 18 at a right angle to the windings thereof. The inner casing 15, which has a compartment 15c formed internally thereof, is provided with a communicating hole 15a for communicating the internal compartment 15 with the valve chamber 13b on the inlet port side, and with a communicating hole 15b for communicating a compartment 14c, formed internally of the casing section 14b, with the valve chamber 13b. The end portion 15d of the casing 15 facing the outlet port 12 is provided with a flange for retaining the corresponding end of the ferromagnetic core 16 within the compartment 15c to fix the core 16 against movement. A magnetic circuit for the magnetic flux produced by the permanent magnets 19a and 19b extends from the inner surface of each permanent magnet, through the clearance 23 between each magnet and the coil 18, and further through the longitudinally extending wall of the core 16 before returning to the outer surface of each permanent magnet via the inner casing 15. Thus the magnetic flux crosses the windings of the coil 18 at a right angle.

The bobbin 17 slidably disposed on the core 16 is elongated at both ends to form lands which control the opening degree of the valve holes 21 and 22, and is provided with communicating holes 17a at the right-hand side of the coil 18 in order to communicate the compartment 14c with the valve holes 22. Thus the communicating holes 17a are adapted to open the valve holes 22. A cylindrical body 20 comprising an insulator (preferably a synthetic resin) is affixed to the bobbin 17 on the outer surface thereof to the right of the coil 18. The cylindrical insulator 20 has a flange 20a at the right-hand side thereof for affixing the two terminal leads 27 of the coil 18.

An annular spring holder 28, also comprising an insulator, is affixed to the interior of the casing section 14b at the right-hand end thereof, opposite the flange 20a of the cylindrical insulator 20, which is affixed to the bobbin 17. Coil springs 25 and 26 are disposed and compressed between the flange 20a and the spring holder 28. The coil springs 25 and 26 are connected at one end to respective ones of the coil terminal leads 27a and 27b, and at the other end to external connection terminals, only one of which, denoted at numeral 29, is shown. Thus the coil springs 25 and 26 serve to connect an external power supply to the electromagnetic coil 18.

A pair of small flanges 17b and 17c are provided on the outer periphery of the bobbin 17 to the left and right of the electromagnetic coil 18 to fix the coil windings axially of the bobbin. A coil spring 34 is disposed in a compressed state between the left-hand flange 17b and the end portion 15d of the inner casing 15. Thus the springs 25 and 26 acting upon the bobbin 17 from the right and the spring 34 acting upon it from the left urge the bobbin in mutually opposing directions. These springs 25, 26 and 34 are so chosen that the opposing forces acting upon the bobbin 17 balance each other in such a manner that the bobbin 17 opens the valve holes 21 approximately mid-way when the electromagnetic coil 18 is in the de-energized state. Furthermore, the arrangement is such that the valve holes 22 are fully closed under such balance conditions by the bobbin 17.

The hollow, ferromagnetic core 16 terminates at its right-hand end at a point beyond the sliding range of the bobbin 17, and has said end fixedly supported on an inwardly projecting cylinder 30 formed on the non-magnetic casing section 14b. A sealing member 31 is interposed between the core 16 and projecting cylinder 30 to hermetically seal the joint between them. A spring 32 is disposed between the right-hand end of the core 16 and the spring holder 28 to urge the core 16 to the left. Thus the core 16 is supported centrally of the casing and is held against movement, its left end being retained by the flange of the inner casing 15, its right end being supported on the projecting cylinder 30.

A slit 17d preferably is provided at the left-hand extremity of the bobbin 17 in order to assure an equivalence in pressure on the inner and outer sides of the bobbin when the valve holes 21 and 22 are fully closed. The valve holes 21 and 22 may have the shapes shown in the sectional views of FIGS. 3a and 3b. The number of these valve holes formed in the wall of the core 16 will be based on the particular operating conditions.

The flow control valve 10 having the foregoing construction operates in the following manner. In FIG. 1 the valve assembly is shown under quiescent conditions, that is, when the electromagnetic coil 18 is in the de-energized state. Under such conditions the opposing forces which the springs 25, 26 and 33 apply to the bobbin 17 are in balance, so that the bobbin 17 is at rest at what will be reffered to hereinafter as the "reference" position, corresponding to the point $Q_0$ in FIG. 2. Also, as described above, the valve holes 21 are opened approximately mid-way under these conditions, permitting a flow rate $Q_0$ of a predetermined magnitude.

Assume now that a positive energizing current is applied to the electromagnetic coil 18 to produce a repulsive force with respect to the permanent magnets 19a and 19b. The repulsive force slides the bobbin 17 toward the right by a distance which is a function of the magnitude of the energizing current. Increasing the energizing current therefore causes the bobbin 17 to open the valve holes 21 to a greater degree, and to begin opening the valve holes 22. When the current reaches a given magnitude, both sets of valve holes 21 and 22 will be fully open. The foregoing process is depicted by the curve I extending to the right of the reference point $Q_0$ in FIG. 2. Reducing the magnitude of the energizing current causes the bobbin 17 to return to the reference position.

Next, assume that a negative energizing current is applied to the coil 18. Owing to the change in polarity, the repulsive force produced in this case will be directed opposite to that of the former repulsive force. As a result, the bobbin 17 is slid to the left in FIG. 1, thereby closing valve holes 21 to a greater degree, while valve holes 22 remain closed. As the negative energizing current is increased, the bobbin 17 closes the valve holes 21 fully and abuts against the end portion 15d of the inner casing 15, so that no further leftward movement of the bobbin is possible. Restoring the negative energizing current to zero causes the bobbin 17 to return to the reference position $Q_0$. This process corresponds to curve I extending to the left of the reference point $Q_0$ in FIG. 2.

According to the present invention, the flow control valve assembly 10 is arranged so that the valve will be open approximately mid-way when the bobbin 17 is at the reference position. Accordingly, if the reference position is taken as the center of mean bobbin movement when the vehicle is running, control can be effected over the necessary range with only a small energizing current.

The effect of the present invention will be obvious from a review of the flow control characteristics of the invention, as shown in FIG. 2, in comparison with the characteristics encountered in the prior art, as depicted in FIG. 4. It will be seen that an energizing current, indicated at the vertical line H in FIG. 4, is required to obtain the same opening degree, or flow rate, indicated at $Q_0$ in FIG. 2, where no energizing current is necessary.

In FIG. 3a and 3b, each one example of the valve holes 21 and 22 is illustrated, respectively.

A suitable number of the valve holes 21 and 22, respectively, may be provided in the wall of the ferromagnetic core 16. For instance, the overall opening area of the valve holes 22 can be increased to a suitable degree. This permits the flow rate characteristics indicated by curve II in FIG. 2 to be obtained. In other words, the slope of the flow rate characteristic curve can be set or changed at will, as a function of the overall opening area of the valve holes 22, for a given range of energizing currents (negative to positive) centered on the reference position.

By disposing the valve holes 22 at positions where they may communicate with the corresponding communicating holes 17a located in the bobbin 17 to the right of coil 18, as shown in FIG. 2, it is possible to achieve greater control of flow rate with less excitation current, or to obtain control characteristics which are much less susceptible to vibration. The foregoing can be accomplished since the valve holes 22 can be provided with the necessary opening area without affecting the magnetic characteristics of the system due to the fact that the valve holes 22 are not disposed in the flux produced by the permanent magnets 19a and 19b.

The valve assembly ordinarily is employed with the inlet port 11 connected to the atmosphere and the outlet port 12 connected to the negative pressure side of the intake system (i.e., to a source of negative pressure). The valve holes 21 and 22 may have shapes other than those illustrated, this being decided upon the particular requirements.

Since the control valve assembly of the present invention is in the half-open state when the electromagnetic coil 18 is de-energized, the assembly is particularly well suited for use as an air-fuel ratio control valve, which forms the by-pass of a throttle valve, for the purpose of controlling the idling speed of an internal combustion engine. In such case the valve assembly may serve as a fast idle mechanism to facilitate engine starting even under ice forming in the throttle valve region.

The inventive valve assembly is useful also as an air-fuel ratio control valve or EGR control valve for an internal combustion engine. Further, although the reference position in the foregoing embodiment is set at a point where the valve holes 22 begin to be opened by the bobbin 17 as the bobbin starts to move to the right, the reference position can be taken as one where the valve holes 22 are in the half-open state, or one where the valve holes 22 remain closed for a predetermined period of time even after the bobbin 17 has started to move to the right.

According to the present invention as described hereinabove, the power consumed to obtain a given flow rate control characteristic can be reduced to a fraction of that required in the prior art. Moreover, it is possible to obtain good stability against vibration, large flow rates with the same level of noise, and optional flow rate control characteristics. Furthermore, when the valve assembly is employed as a valve for controlling idling speed, a predetermined feed of air and fuel can be achieved even if ice forms in the throttle valve region.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A linear motor-actuated flow control valve which comprises:

a casing having an inlet port and an outlet port, a moving-coil linear motor disposed within said casing and including:

a hollow, ferromagnetic core which delimits the interior of said casing into valve chambers, said core having first and second hole means, said first and second hole means each arranged to communicate said inlet port with said outlet port, said first and second hole means being spaced apart longitudinally, a bobbin longitudinally slidably disposed on said core for controlling the degree of opening of said first and second hole means, said bobbin arranged to begin opening said second hole means when said first hole means is partially opened, an electromagnetic coil wound on said bobbin, a permanent magnet arranged so that a magnetic flux produced thereby extends axially of said electromagetic coil, and a magnetic body for forming, together with said core, a magnetic circuit for the flux produced by said permanent magnet, first spring means for biasing said bobbin in one longitudinal direction and defining electric supply lines to said coil, second spring means for biasing said bobbin in the opposite longitudinal direction, said bobbin being retained at a predetermined position by said first and second spring means when said coil is in a de-energized state, wherein said first hole means is open to a predetermined degree, and said bobbin driven selectively against the biasing force of said first and second spring means in response to the application of a positive or negative energizing current to said coil to regulate the flow between said inlet and outlet ports.

2. A flow control valve according to claim 1, wherein said bobbin is arranged to begin opening said second hole means when said first hole means is opened about midway.

3. A flow control valve according to claim 1, wherein said first and second hole means each comprise a plurality of holes.

4. A flow control valve according to claim 1, wherein said magnetic circuit is arranged to pass through a part of said core containing said first hole means and to avoid passing through a part of said core containing said second hole means.

5. A flow control valve according to claim 4, wherein said magnetic circuit passes through an intermediate section of said core and toward only one end thereof.

6. A flow control valve according to claim 4, wherein said magnetic body comprises an inner casing surrounding said core and carrying said permanent magnet.

7. A flow control valve according to claim 1, wherein said second hole means is closed by said bobbin when said coil is in its de-energized state.

8. A linear motor-actuated flow control valve which comprises:

a casing having an inlet port and an outlet port, a moving-coil linear motor disposed within said casing and including:

a hollow, ferromagnetic core which delimits the interior of said casing into valve chambers, said core having first and second hole means, said first and second hole means arranged to communicate said inlet port with said outlet port, said first and second hole means being longitudinally spaced apart, a bobbin longitudinally slidably disposed on said core for controlling the degree of opening of said first and second hole means, an electromagnetic coil wound on said bobbin, a permanent magnet arranged so that a magnetic flux produced thereby extends axially of said electromagnetic coil, and a magnetic body for forming, together with said core, a magnetic circuit for the flux produced by said permanent magnet, the circuit arranged to pass through a part of said core containing said first hole means and to avoid passing through a part of said core containing said second hole means, first spring means for biasing said bobbin in one longitudinal direction and defining electric supply lines to said coil, second spring means for biasing said bobbin in the opposite longitudinal direction, said bobbin being retained at a predetermined position by said first and second spring means when said coil is in a de-energized state, wherein said first hole means is open to a predetermined degree, and said bobbin being driven selectively against the biasing force of said first and second spring means in response to the application of a positive or negative energizing current to said coil to regulate the flow between said inlet and outlet ports.

9. A flow control valve according to claim 8, wherein said magnetic circuit passes through an intermediate portion of said core and toward only one end thereof.

10. A flow control valve according to claim 8, wherein said magnetic body comprises an inner casing surrounding said core and carrying said permanent magnet.

11. A flow control valve according to claim 8, wherein said second hole means is closed by said bobbin when said coil is in its de-energized state.

12. A flow control valve according to claim 8, wherein said bobbin is arranged to begin opening said second hole when said first hole means is opened about midway.

* * * * *